Aug. 29, 1961

R. J. NAMSICK ET AL 2,998,601

CONTAINER FOR SHOCK SENSITIVE OBJECTS
AND METHOD OF MANUFACTURE THEREFOR

Filed March 31, 1958

INVENTORS
RAYMOND J. NAMSICK
CASIMIR T. WITTL
FRANK J. JENKINS

BY

*R. L. Miller*
ATTORNEY

Aug. 29, 1961

R. J. NAMSICK ET AL 2,998,601

CONTAINER FOR SHOCK SENSITIVE OBJECTS
AND METHOD OF MANUFACTURE THEREFOR

Filed March 31, 1958

INVENTOR.
RAYMOND J. NAMSICK
CASIMIR T. WITTL
FRANK J. JENKINS

BY

R. L. Miller
ATTORNEY

Aug. 29, 1961 R. J. NAMSICK ET AL 2,998,601
CONTAINER FOR SHOCK SENSITIVE OBJECTS
AND METHOD OF MANUFACTURE THEREFOR
Filed March 31, 1958 4 Sheets-Sheet 3

INVENTORS
RAYMOND J. NAMSICK
CASIMIR T. WITTL
FRANK J. JENKINS
BY
P.L. Miller
ATTORNEY Aug. 29, 1961  R. J. NAMSICK ET AL  2,998,601
CONTAINER FOR SHOCK SENSITIVE OBJECTS
AND METHOD OF MANUFACTURE THEREFOR
Filed March 31, 1958  4 Sheets-Sheet 4
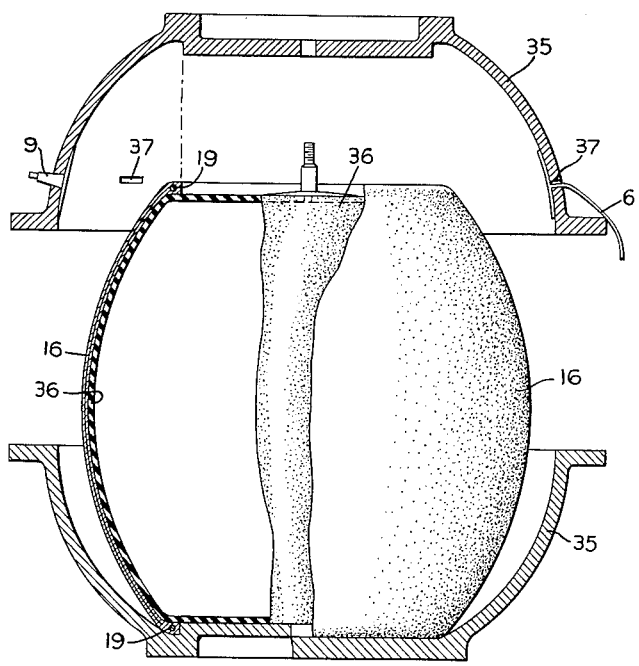
FIG. 6
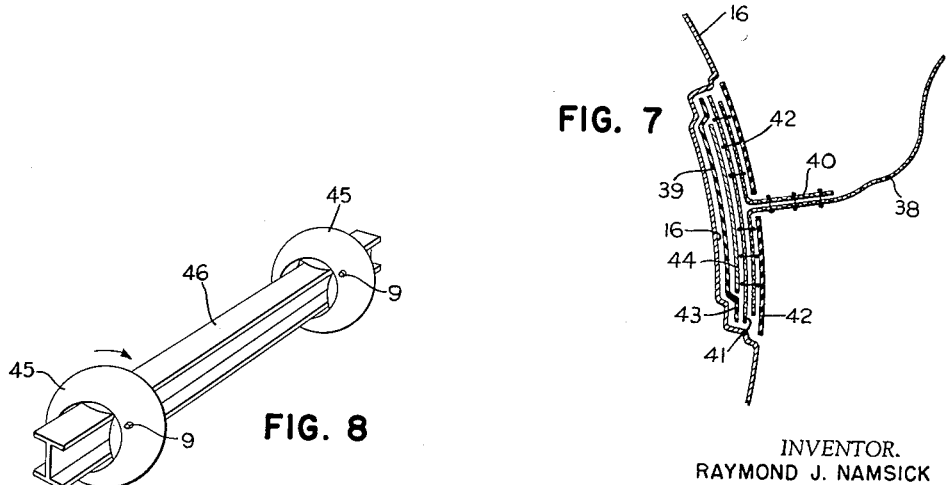
FIG. 7
FIG. 8
INVENTOR.
RAYMOND J. NAMSICK
CASIMIR T. WITTL
BY FRANK J. JENKINS
ATTORNEY

United States Patent Office 2,998,601
Patented Aug. 29, 1961

2,998,601
CONTAINER FOR SHOCK SENSITIVE OBJECTS AND METHOD OF MANUFACTURE THEREFOR
Raymond J. Namsick, Akron, Casimir T. Wittl, Tallmadge, and Frank J. Jenkins, Akron, Ohio, assignors to The Goodyear Tire & Rubber Company, Akron, Ohio, a corporation of Ohio
Filed Mar. 31, 1958, Ser. No. 725,427
5 Claims. (Cl. 343—720)

This invention relates primarily to containers for shock sensitive articles and in particular to containers for the air-dropping of radio transmitters and the like.

In recent years the need for shock absorbing containers for objects which are to be air-dropped or parachuted into remote and inaccessible spots has increased rapidly. Although one of the principal uses of such containers is in supplying military troops during war time, there are other uses such as the delivery of emergency supplies during floods and other natural disasters, fire fighting in remote areas and similar activity. Previously used containers have certain disadvantages in that they are bulky, hard to handle, and are not easily adapted to accommodate objects which vary widely in size and configuration. Furthermore, such containers are difficult to manufacture, requiring much special cutting and fitting of components and a great deal of hand labor in order to produce an article capable of withstanding extreme shock. In addition, containers which were made of rubberized fabric many times had to be processed through multiple vulcanization steps to arrive at the final product.

It is a primary object of the present invention to provide a versatile shock absorbing container for the air delivery of shock sensitive objects.

It is a further object of the present invention to provide such a container which can be manufactured easily and without the use of complex procedures.

It is a still further object of the present invention to provide a container for the handling of special articles of extreme sensitivity such as radio transmitters, homing beacons, and the like.

These and other objects of the invention will become apparent from the following description and drawings in which:

FIG. 6 is a view similar to FIG. 5 showing a container with certain fittings just prior to vulcanization;

FIG. 7 is a detail of a fitting or attachment for said container; and

FIG. 8 is illustrative of the use of a modification of the container illustrated in FIGS. 1 through 4.

As previously mentioned, specialized containers are required for the air delivery of many objects, particularly those which are highly sensitive to shock such as radio transmitters, medical supplies, optical instruments, and the like. It has heretofore been the practice to utilize large bulky containers with heavy padding and rather complex mechanical shock absorbing systems in order to protect sensitive articles during air delivery. Because of these and other serious limitations such devices have not been satisfactory for specialized use in the air drop of homing beacons and the like. Although pneumatic shock absorbers have been attempted for this purpose, they have not been completely successful due to the large bulk involved and the extremely complex and costly process of manufacture. The present invention provides a compact and highly efficient shock absorbing container for this and a variety of other purposes as well as one which may be manufactured simply and economically.

Figure 1:
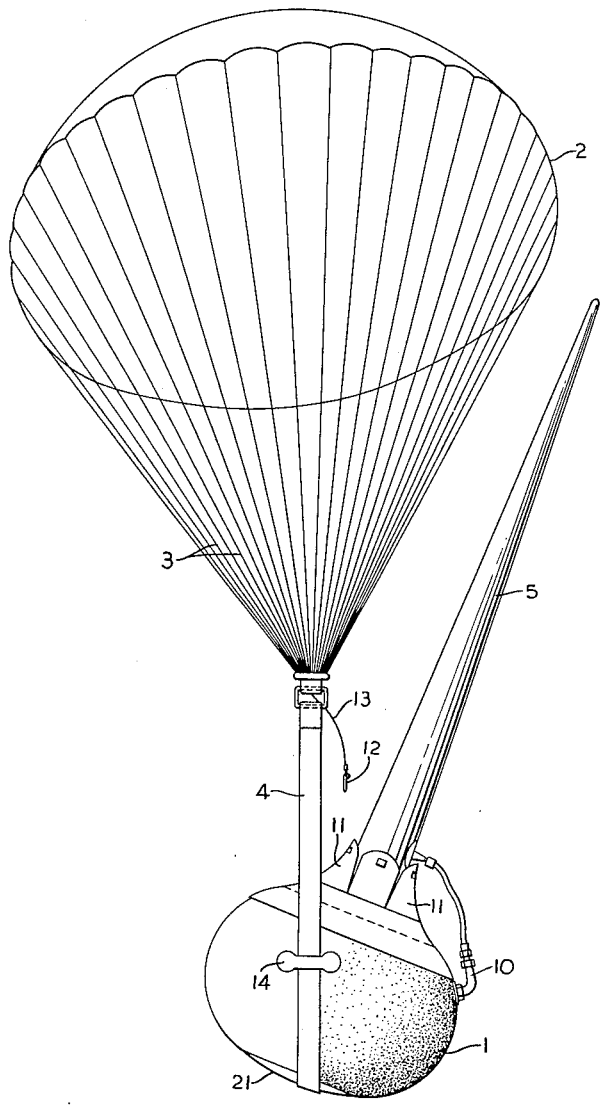
FIG. 1 illustrates a container made according to the present invention being used to air-drop a radio transmitter.
Figure 2:
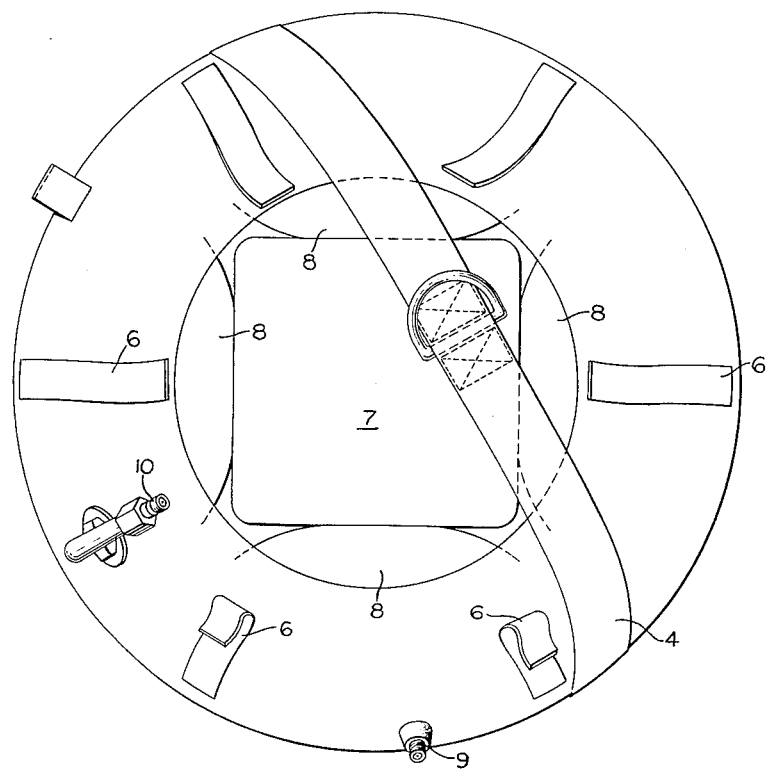
FIG. 2 is a top plan view of a container made according to the present invention.

Referring to FIG. 1, a container 1 is shown suspended from a parachute 2 by means of the shrouds 3 and the harness 4. As will become clear later, the container carries a radio transmitter which is electrically connected to the inflatable antenna 5. FIG. 1 illustrates the use of a container made according to the present invention for the air drop of a homing beacon. Although shown attached to a parachute, it could, if desired, be attached to a pallet which in turn is connected to a chute. The operation of the container illustrated in FIG. 1 can be more clearly understood from FIG. 2. From the top, the container 1 has a generally toroidal or annular shape. The main body of the container has straps 6 vulcanized thereto which are utilized to attach the antenna 5 to the top of the container 1. The container has a dual wall structure, which will subsequently be explained in detail. Upon inflation of the chamber formed by the dual walls, the inner wall expands inwardly to grip an object inserted therein, such as the radio 7, by means of the lobes 8 formed by natural puckers of the inner wall of the annulus. The container 1 is also equipped with an inflation valve 9 and an air tube or antenna air connector 10 which are vulcanized to the outer sidewall of the container. The air tube 10 may be seen in FIG. 1 and is connected to the antenna 5 to inflate it when the main bag is pressurized and the antenna is released from the bag. Prior to air drop, the antenna 5 is retained in a collapsed uninflated state by a closure means such as cover flaps 11 which may be seen in FIG. 4. The antenna is released to inflate by the pull type release 12 holding the flaps 11 in place. The release 12 is actuated in turn by the opening of the parachute to which it is connected by means of lanyard 13. The harness 4 is secured to the main container body by means of loops 14 which are vulcanized to the outer wall thereof. As may be seen in FIGS. 1 and 4, the harness 4 is connected to the container 1 in such a fashion that the container is suspended at an angle during descent so that the antenna 5 will not foul in the harness or the parachute shrouds during inflation. For ease of handling, two strap members similar to members 6 in FIG. 2 may be riveted together to form the carrying handle 15 shown in FIG. 4.

Figure 3:
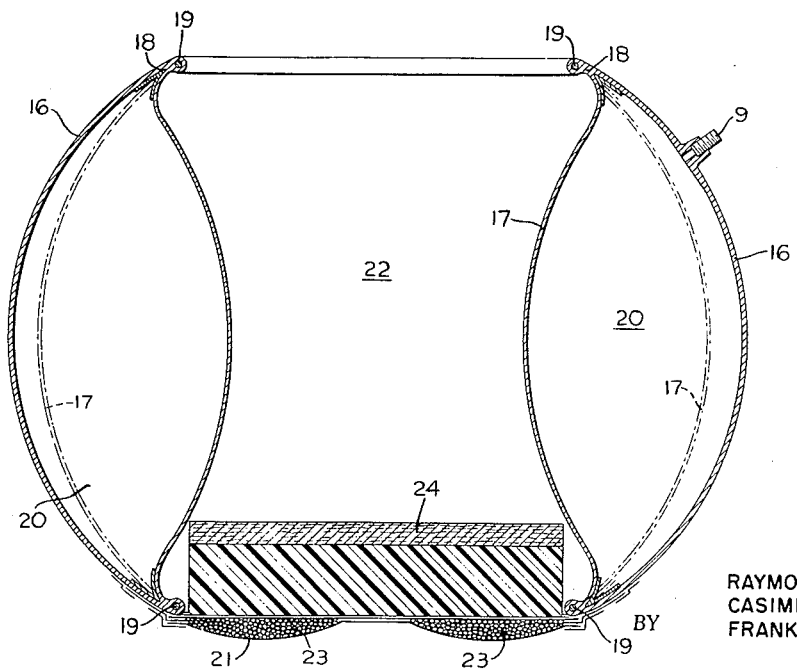
FIG. 3 is a cross section of a container similar to that shown in FIG. 2.

FIG. 3 shows the container in cross section and illustrates the dual wall structure. The container body comprises an annular outer wall 16 having an outwardly bowed arcuate configuration. An inner wall 17 having substantially the same size and configuration as the outer wall 16 is joined thereto at the peripheral edges 18. The juncture of the walls is reinforced by beads 19 about which the walls are turned up in much the same fashion as in a tire structure. When the bag is deflated, the inner wall tends to lie along the outer wall in the position shown by the dotted lines in FIG. 3. However, upon inflation, the inner wall expands inwardly upon itself and, since as it expands it moves through a position of decreasing diameter, it puckers to form the lobes 8 shown in FIG. 2. These lobes resiliently grip an object inserted in the container and provide shock absorbing support thereto. The inner wall will form naturally almost any desired number of lobes as it is inflated, depending on the configuration of the object about which it expands. Of course, mechanical means such as tie threads or the like may be used to control the number of lobes formed if desired. The outer wall 16 and the inner wall 17 form a generally annular inflatable chamber 20 which may be pressurized by any convenient means through the valve 9. A bottom cover 21 extends across one end of the annular inflatable chamber and is vulcanized thereto. The cover defines, along with the inner container wall, an object receiving chamber designated generally by the numeral 22. In order to maintain the container in an upright position when it is at rest, regardless of wind and similar forces which may be acting horizontally thereto, stabilizing weights 23 are attached to the cover 21. In FIG. 3 the cover 21 is made with an integral annular pocket which contains ten pounds of buckshot to provide a stabilizing effect. Other types of stabilizing devices may be utilized but the one illustrated is preferred because of its flexibility. A cushion 24 may be utilized inside the chamber 22 to absorb vertical impact forces which might be transmitted to the object being dropped. The cushion 24 may be of a variety of structures, the one illustrated being a closed cell vinyl pad with an upper layer of felt or horse hair to prevent cutting of the pad by the edges of the radio upon impact and the consequent delivery of shock to the radio through the cover 21.

Figure 4:
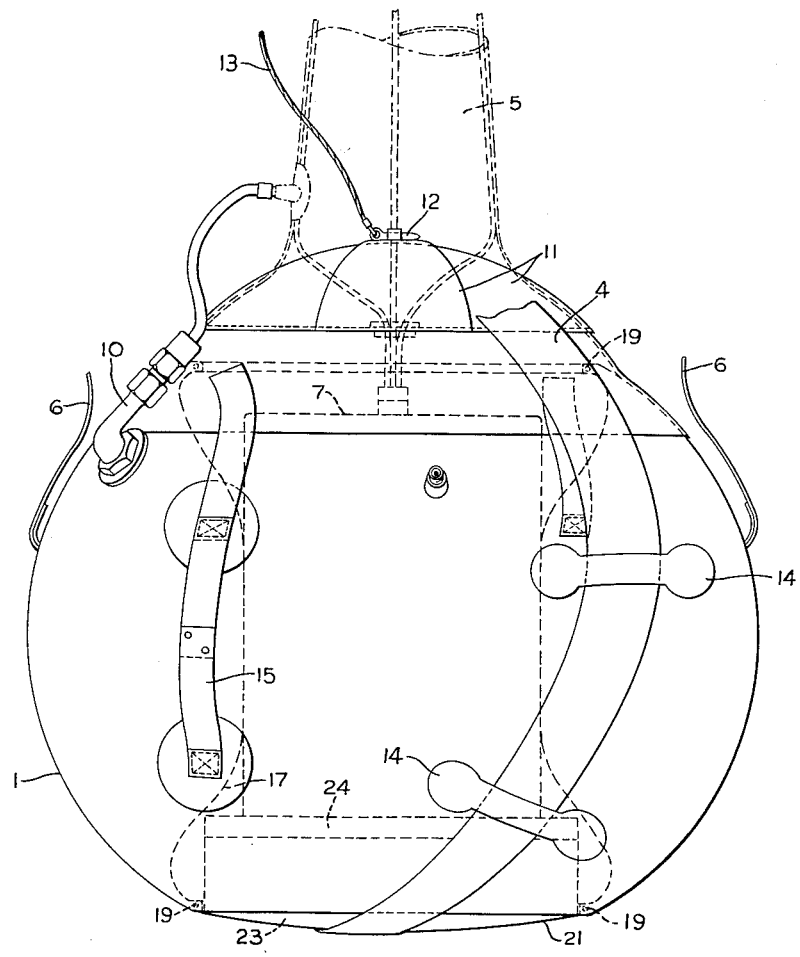
FIG. 4 is a detail of a container in operative use such as shown in FIG. 3.

A completely assembled combination of the container, radio and antenna is illustrated in FIG. 4. As can be seen in that figure, the inner wall 17 has moved inwardly under the force of inflation to resiliently grip the radio 7 and hold it in place. The action of the walls may be explained in the following manner. In general, any flexible object tends to assume a spherical wall shape when inflated. The outer wall of the container retains position during inflation due to the fact it has essentially the spheroidal form and any tendency for it to move outwardly is resisted since this is away from the spheroidal condition. Furthermore, movement of the outer wall in a radially outwardly direction is in direct opposition to the direction of tension in the wall and hence is limited. However, this is not true of the inner wall since motion in a radially inwardly direction is towards a position of lesser wall width and hence is in the direction of decreasing wall tension. Thus, the inner wall expands toward the center of the container and a spheroidal shape, progressing in a radially inward direction until further expansion of the wall is in opposition to the tension in the cords or movement is impeded by an object in the chamber. As the inner wall contacts an object it tends to conform to and partially envelope in the manner illustrated in the drawings.

The antenna 5 is shown in its inflated position in FIG. 4 by means of the dotted outline. In that position the antenna is connected to the main inflation chamber of the container by means of air tube 10. Air tube 10 contains a check valve (not shown) which acts to prevent deflation of the antenna in the event that the main inflation chamber is accidentally depressurized. The function of lanyard 13 and pull release 12 which holds the flap type stowage covers 11 in place has been previously explained.

A container used for the purpose illustrated is inflated to a nominal pressure of 8 p.s.i.g. prior to air drop, although other pressures may be utilized as required by antenna rigidity and the gripping force desired in the inner wall. Eight pounds initial pressure has been found to provide suitable shock absorption for a radio transmitter dropped freefall 35 feet. Under this inflation pressure, the antenna will inflate and remain rigid under extreme conditions while the total pressure in the system will drop no lower than about 6 p.s.i.g. Hence, adequate pneumatic shock absorption and antenna rigidity are maintained by relatively low and easily obtained pressure. The stabilizing weights in the bag bottom have been found to be effective to retain the container in a substantially upright position in winds in excess of 60 m.p.h.

Figure 5:
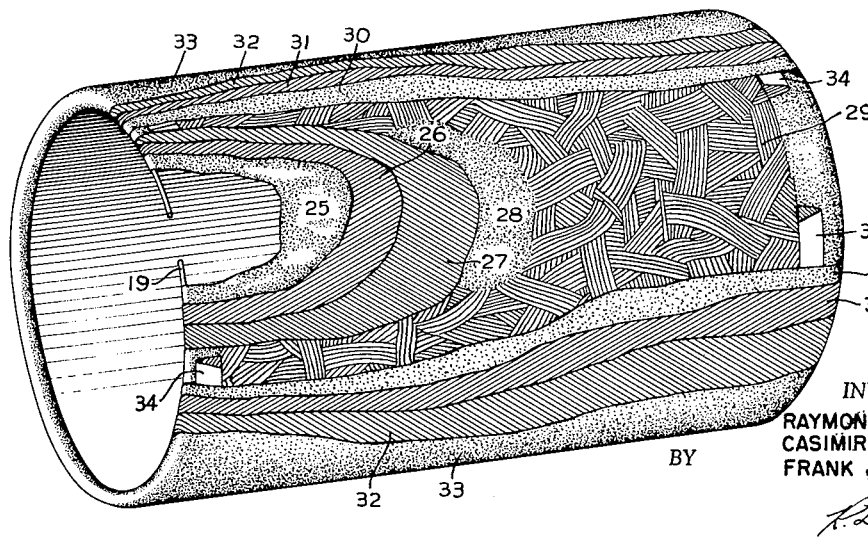
FIG. 5 is a partially sectionalized view of the body of such a container after building and prior to vulcanization.

The manufacture and the details of bag structure may be more completely understood by an examination of FIG. 5 which represents a fully built but unshaped container prior to the addition of the bottom cover and the fixtures. In FIG. 5 the container is built up on a substantially flat surfaced cylindrical drum and includes a gum ply 25, first and second fabric plies 26 and 27, a second gum ply 28, and an anti-adherent coating 29. The latter may be any of several well known materials, many of which are rubber cements highly loaded with mica or similar materials. These cements have the property of sticking to the surface to which they are applied but preventing other materials from adhering to their outer surface. This anti-adherent material is applied over the entire wall area except for narrow margins along the peripheral edges of the walls at which point the walls are vulcanized together. A third gum ply 30 and third and fourth fabric plies 31 and 32 and a fourth gum ply 33 are built up on top of the previously described structure. Bead members 19 are applied to either end of this structure and the peripheral wall edges are turned up about them in a manner similar to a pneumatic tire. Prior to this, crotch strips 34 are placed between the two walls along the periphery thereof which act to take up inflation strains which might result in tearing or separation out of the walls at the vulcanized edge thereof. For certain purposes, the beads may be eliminated if desired or replaced by fabric reinforcing. However, for the present purpose they are desirable for container strength and impact resistance.

FIG. 6 illustrates the container as it is in the mold 35 just prior to vulcanization. The container has been preformed somewhat by the low pressure inflation of a conventional curing bag 36 prior to insertion into the mold. The valve 9 and straps 6 are inserted into the mold through slots 37 cut in the sides thereof. The valve and straps are placed with their bases against the outer wall 16 of the container and during the subsequent vulcanization, when the curing bag is inflated to high pressure, are pressed between the container outer wall and the mold interior so that they become securely vulcanized to the container during cure. After vulcanization is complete, the valve 9 may be drilled through its center to create a passage into the air retaining chamber of the container and a valve core then inserted.

FIG. 7 illustrates a typical strap construction and is shown for the purpose of indicating certain important features. The strap is made up generally of a web 38 and a base portion designated generally by numeral 39. The base fits against and is vulcanized to the outer container wall 16. The base comprises a strengthening strap 40, a fabric disk 41, a gum rubber surface disk 42, a gum rubber base disk 43 and a metal disk 44. The function of the gum rubber disks is, of course, to assure a vulcanization of the strap to the container and also provide protective covering. The metal disk is placed in the assembly to prevent the strap from being forced out through the mold slot 37 when the curing bag is inflated to high pressure, pressing the container against the mold inner wall. The valve 9 may also contain a metal base member for the same purpose. Two strap members 6, applied adjacent each other on the container, may be turned back upon each other and subsequently riveted together to form a handle 15 such as illustrated in FIG. 4.

Subsequent to vulcanization, the cover with its integral stabilizing weights is air cured to the container as are the antenna connector and the harness loops previously described.

The anti-adherent material previously mentioned functions during vulcanization to prevent the inner and outer walls of the container from adhering to each other except along the peripheral edges. Thus, the inflatable annular chamber is manufactured in a simple one step build and cure process which involves no expensive cutting and fitting of parts.

FIG. 8 illustrates a use of a modified form of the dual wall container of the present invention. With the straps and antenna connector removed and the air valve 9 moved to a new position as shown, a plurality of containers 45 may be utilized to facilitate transportation and handling of an I beam 46 or similar heavy object. In this use, the uninflated containers are slipped over the ends of the beam and positioned at any convenient points or intervals. The containers are then inflated so that the inner wall expands inwardly to grip the beam in much the same manner as it grips the radio for air drop purposes. When the containers are inflated, the beam may easily be rolled from place to place without the need for large lifts or cranes. The possibilities of utilizing the beam and container combinations to build moving platforms and the like will be obvious to those skilled in the art.

While certain representative embodiments and details have been shown for the purpose of illustrating the invention, it will be apparent to those skilled in this art that various changes and modifications may be made therein without departing from the spirit or scope of the invention.

We claim:

1. A container for use in the air-drop of a radio or similar article comprising in combination an outer air-impervious flexible wall formed into an annulus having an outwardly bowed arcuate side, an inner air-impervious flexible wall of substantially the same size and outwardly bowed configuration as said outer wall, said walls being joined together along their peripheral edges to form an inflatable annular chamber so that upon inflation of said chamber said inner wall moves inwardly towards the center of the annulus defined by said chamber to resiliently grip a radio or the like located within said annulus, reinforcing beads on each end of said annulus adjacent said joined edges, cover means attached to and extending across one end of said annulus and defining with said walls an object receiving chamber, stabilizing means adjacent said cover means to maintain said container in a stable attitude when at rest, means to inflate said annular chamber after said radio or the like is placed within said receiving chamber, inflatable antenna means attached to the uncovered end of said annulus, and air-connecting means attached to and in conducting relationship with said annular chamber and said antenna means to permit inflation of said antenna means and said chamber by said inflating means.

2. A container as claimed in claim 1 including harness means attached thereto to permit attachment of said container to an air-drop device, said harness means being so constructed and arranged to maintain said container suspended in a canted position to avoid fouling said antenna means with said air-drop device during inflation of said antenna.

3. A container for use in the air-drop of a radio or similar article comprising in combination an outer air-impervious flexible wall formed into an annulus having an outwardly bowed arcuate side, an inner air-impervious flexible wall of substantially the same size and outwardly bowed configuration as said outer wall, said walls being joined together along their peripheral edges to form an inflatable annular chamber so that upon inflation of said chamber said inner wall moves inwardly towards the center of the annulus defined by said chamber to resiliently grip a radio or the like located within said annulus, reinforcing means on each end of said annulus adjacent said joined edges, cover means attached to and extending across one end of said annulus and defining with said walls an object receiving chamber, stabilizing means adjacent said cover means to maintain said container in a stable attitude when at rest, means to inflate said annular chamber after a radio or the like is placed within said receiving chamber, inflatable antenna means attached to the uncovered end of said annulus, air connecting means attached to and in conducting relationship with said annular chamber and said antenna means to permit inflation of said antenna means and annular chamber by said inflating means, said air connecting means having check means associated therewith to prevent deflation of said antenna means upon accidental deflation of said chamber, and harness means attached to said container to permit attachment thereof to an air-drop device, said harness means being so constructed and arranged to maintain said container suspended in a canted position to avoid fouling said antenna means with said air-drop device upon inflation of said antenna means during descent of said container.

4. A container as claimed in claim 3 including closure means attached to the uncovered end of said annulus and adapted to retain said antenna means in a collapsed condition prior to the air-drop of said container, and release means restraining said closure means and actuatable upon air-drop of the said container to release said closure means and permit the inflation of said antenna means by passage of an inflating medium from said annular chamber through said air-connecting means to said antenna means.

5. A container for use in the air-drop of a radio transmitter or similar article comprising in combination an outer air-impervious rubberized-fabric wall formed into an annulus having an outwardly bowed arcuate side, an inner air-impervious rubberized-fabric wall of substantially the same size and outwardly bowed configuration as said outer wall, said walls being joined together along their peripheral edges to form an inflatable annular chamber so that upon inflation of said chamber said inner wall moves inwardly toward the center of the annulus defined by said chamber to resiliently grip a radio or the like located within said annulus, reinforcing beads attached to each end of said annulus adjacent said joined edges, a cover joined to and extending across one end of said annulus and defining with said inner wall an object receiving chamber, stabilizing weights integrally attached to said cover to maintain said container in a stable attitude when at rest, valve means to inflate said annular chamber after a radio or the like is placed in said receiving chamber, an inflatable antenna attached to the uncovered end of said annulus, an air-connecting tube attached to and in conducting relationship with said antenna and annular chamber to permit inflation of both of them by said valve means, said air-connecting tube having check means therein to prevent deflation of said antenna upon accidental deflation of said chamber, and harness means attached to said container to permit attachment thereof to an air-drop device, said harness means being so constructed and arranged to maintain said container suspended in a canted position to avoid fouling said antenna with said air-drop device upon inflation of said antenna during descent of said container.

References Cited in the file of this patent

UNITED STATES PATENTS

| | | |
|---|---|---|
| 1,457,496 | Butler | June 5, 1923 |
| 1,556,435 | Gorayeb | Oct. 6, 1925 |
| 1,668,782 | Roberts | May 8, 1928 |
| 1,827,322 | Lindermann | Oct. 13, 1931 |
| 2,175,603 | Hartmann | Oct. 10, 1939 |
| 2,219,974 | Bellow | Oct. 29, 1940 |
| 2,443,440 | Alvarez | June 15, 1948 |
| 2,689,812 | Mollica | Sept. 21, 1954 |
| 2,907,875 | Seyfang | Oct. 6, 1959 |

FOREIGN PATENTS

| | | |
|---|---|---|
| 539,712 | Belgium | July 30, 1955 |